(12) United States Patent
Seroff (10) Patent No.: US 8,645,723 B2
(45) Date of Patent: Feb. 4, 2014

(54) ASYNCHRONOUS MANAGEMENT OF ACCESS REQUESTS TO CONTROL POWER CONSUMPTION

(75) Inventor: Nicholas Seroff, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 215 days.

(21) Appl. No.: 13/105,161

(22) Filed: May 11, 2011

(65) Prior Publication Data

US 2012/0290864 A1 Nov. 15, 2012

(51) Int. Cl.
*G06F 1/00* (2006.01)
*G06F 1/26* (2006.01)
*G06F 9/46* (2006.01)

(52) U.S. Cl.
USPC ........... 713/300; 713/320; 713/340; 718/100; 718/102

(58) Field of Classification Search
USPC .................. 713/300, 320, 340; 718/100, 102
See application file for complete search history.

(56) References Cited

U.S. PATENT DOCUMENTS

| | | | |
|---|---|---|---|
| 5,724,592 A | 3/1998 | Garner | |
| 6,748,441 B1 | 6/2004 | Gemmell | |
| 6,748,493 B1 | 6/2004 | Arroyo et al. | |
| 6,834,353 B2* | 12/2004 | Smith et al. | 713/320 |
| 7,305,572 B1 | 12/2007 | Burroughs et al. | |
| 7,440,215 B1 | 10/2008 | Sardella et al. | |
| 7,647,516 B2* | 1/2010 | Ranganathan et al. | 713/320 |
| 7,831,843 B2* | 11/2010 | Brundridge et al. | 713/300 |
| 2002/0181311 A1 | 12/2002 | Miyauchi et al. | |
| 2003/0079150 A1* | 4/2003 | Smith et al. | 713/320 |
| 2003/0126475 A1 | 7/2003 | Bodas | |
| 2005/0125703 A1 | 6/2005 | Lefurgy et al. | |
| 2006/0082222 A1 | 4/2006 | Pincu et al. | |
| 2006/0090098 A1* | 4/2006 | Le et al. | 714/6 |
| 2006/0184758 A1 | 8/2006 | Satori et al. | |
| 2006/0288241 A1 | 12/2006 | Felter et al. | |
| 2007/0211551 A1 | 9/2007 | Yogev et al. | |
| 2007/0260896 A1* | 11/2007 | Brundridge et al. | 713/300 |
| 2007/0260897 A1* | 11/2007 | Cochran et al. | 713/300 |
| 2008/0022140 A1* | 1/2008 | Yamada et al. | 713/322 |
| 2009/0113221 A1* | 4/2009 | Holle et al. | 713/310 |

(Continued)

FOREIGN PATENT DOCUMENTS

| | | |
|---|---|---|
| EP | 0878755 | 11/1998 |
| EP | 0955573 | 11/1999 |

(Continued)

OTHER PUBLICATIONS

Inventor: Post et al., U.S. Appl. No. 13/036,460, filed Feb. 28, 2011.

*Primary Examiner* — Mark Connolly
(74) *Attorney, Agent, or Firm* — Van Court & Aldridge LLP (57) ABSTRACT

Systems and methods are disclosed for asynchronous management of access requests to control power consumption. In some cases, by asynchronously managing power within a system, multiple dies of a NVM can simultaneously draw current in order to match the power demand. In particular, an arbiter of the system can receive multiple requests to draw current, where each request may be associated with a different die of the NVM. In some embodiments, the arbiter can determine the servicing order using the time of arrival of the request (e.g., a first-in, first-out scheme). In other embodiments, the arbiter can simultaneously service multiple requests so long as the servicing of the multiple requests does not exceed a power budget.

10 Claims, 6 Drawing Sheets

(56) References Cited

U.S. PATENT DOCUMENTS

| | | |
|---|---|---|
| 2010/0036998 A1 | 2/2010 | Ben-Rubi |
| 2010/0049905 A1 | 2/2010 | Ouchi |
| 2010/0162006 A1 | 6/2010 | Therien et al. |
| 2010/0293439 A1 | 11/2010 | Flynn et al. |
| 2010/0293440 A1 | 11/2010 | Thatcher et al. |
| 2011/0173462 A1 | 7/2011 | Wakrat et al. |
| 2011/0289329 A1* | 11/2011 | Bose et al. .................. 713/320 |
| 2012/0023346 A1 | 1/2012 | Byom et al. |
| 2012/0023351 A1 | 1/2012 | Wakrat et al. |
| 2012/0023356 A1 | 1/2012 | Byom et al. |
| 2012/0209442 A1* | 8/2012 | Ree .............................. 700/295 |

FOREIGN PATENT DOCUMENTS

| | | |
|---|---|---|
| EP | 1688866 | 8/2006 |
| EP | 1818830 | 8/2007 |
| WO | 03/029951 | 4/2003 |
| WO | 2006/059698 | 6/2006 |
| WO | 2007/024396 | 3/2007 |
| WO | 2008/017624 | 2/2008 |

* cited by examiner

ASYNCHRONOUS MANAGEMENT OF ACCESS REQUESTS TO CONTROL POWER CONSUMPTION

BACKGROUND OF THE DISCLOSURE

Memory devices, such as volatile memories and non-volatile memories ("NVMs"), are commonly used for mass storage. For example, consumer electronics such as portable media players often include different types of memory to store music, videos, and other media.

For example, a system having non-volatile memory can receive multiple requests from a file system to access one or more dies of the non-volatile memory. Each of these requests may be associated with a particular current draw. Hence, during a particular period of time, the system may have multiple outstanding requests that need to draw current from a power source.

Conventionally, a token can be circulated from die to die, and a request may be serviced only when a die associated with the request has been provided with the token. Latency problems may exist in such a configuration. In particular, once a particular die has passed off the token, the die must wait for a period of time before a request associated with the die can be serviced.

SUMMARY OF THE DISCLOSURE

Systems and methods are disclosed for asynchronous management of memory to control power consumption. By asynchronously managing power within a system, multiple dies of a NVM can be used with minimum latency and power consumption.

BRIEF DESCRIPTION OF THE DRAWINGS

The above and other aspects and advantages of the invention will become more apparent upon consideration of the following detailed description, taken in conjunction with accompanying drawings, in which like reference characters refer to like parts throughout, and in which.

DETAILED DESCRIPTION OF THE DISCLOSURE

Systems and methods for asynchronous management of memory, including non-volatile memory ("NVM"), to control power consumption are provided. Asynchronous management of power consumption can reduce input/output latencies in a system.

In some embodiments, an arbiter of a system can receive a request from a NVM interface, where the request may be associated with a die of a NVM. The request may be an access request (e.g., a read, program, or erase command).

Once the request has been received, the arbiter can add the received request and associated current draw to a queue of requests. The queue of requests can include requests that have been received from the NVM interface but that have not yet been serviced. After the request and associated current draw has been added to the queue, the arbiter can send a signal to the NVM interface, where the signal acknowledges the request.

In order to service one or more requests in a queue of requests, the arbiter can select a request from the queue of requests. The arbiter can then determine whether adding a current draw of the request to a current consumption will exceed a power budget of the system. If the arbiter determines that adding the current draw of the request to the current consumption will not exceed the power budget, the arbiter can select to service the request by enabling the die that is associated with the request to draw current from a power source.

In some cases, the arbiter can receive multiple requests to draw current, where each request may be associated with a different die of a NVM. After receiving the multiple requests, the arbiter may determine a servicing order using one or more suitable parameters such as, for example, the time of arrival of a request, the amount of current draw of a request, a power budget, any other suitable parameter, and/or any combination thereof.

In some embodiments, the arbiter can determine the servicing order using the time of arrival of a request (e.g., using a first-in, first-out scheme). In other embodiments, the arbiter can simultaneously service multiple requests so long as the servicing of the multiple requests does not exceed the power budget.

Figure 1:
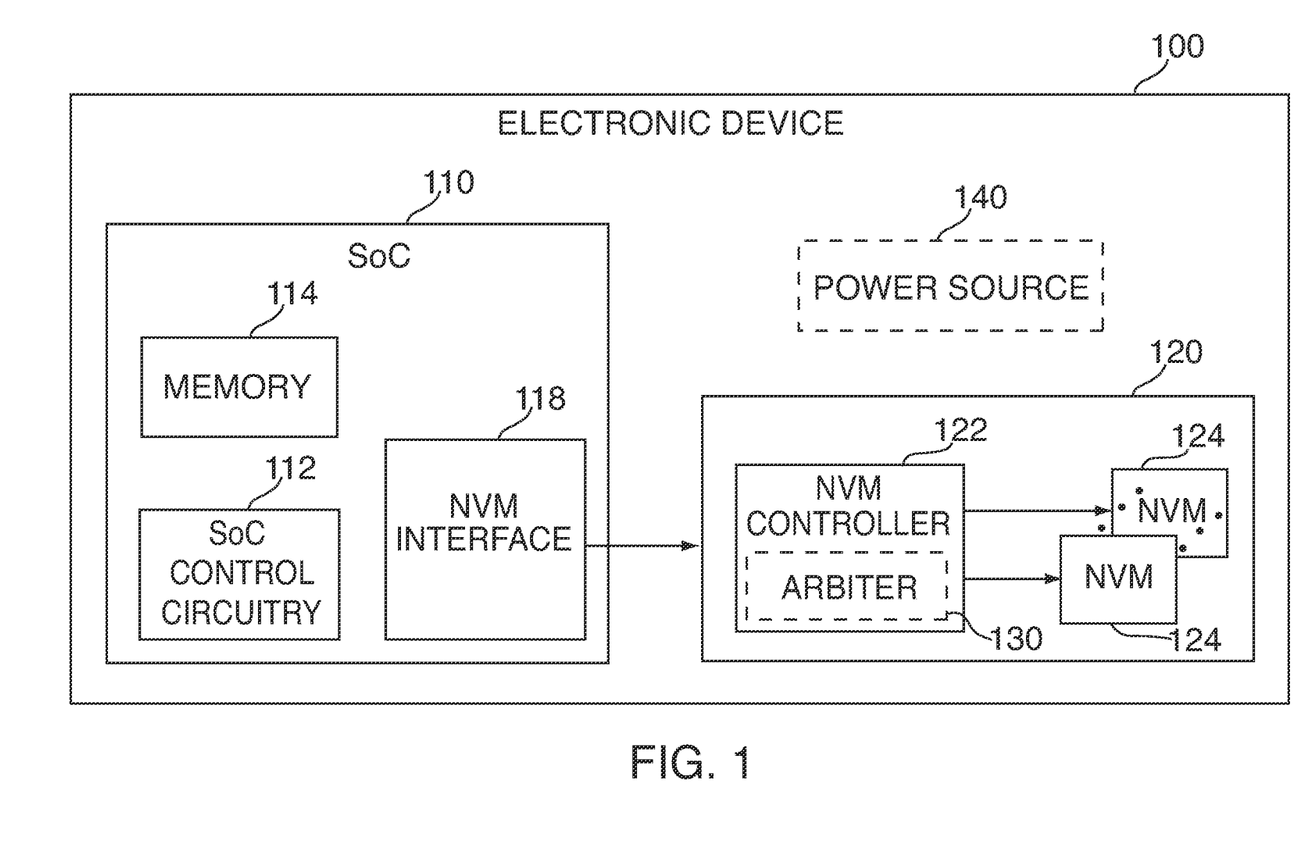
FIG. 1 is a block diagram of an electronic device configured in accordance with various embodiments of the invention.

FIG. 1 illustrates a block diagram of electronic device 100. In some embodiments, electronic device 100 can be or can include a portable media player, a cellular telephone, a pocket-sized personal computer, a personal digital assistance ("PDA"), a desktop computer, a laptop computer, and any other suitable type of electronic device.

Electronic device 100 can include system-on-a-chip ("SoC") 110, non-volatile memory ("NVM") 120, and power source 140. Non-volatile memory 120 can include multiple integrated circuit ("IC") dies 124, which can be but is not limited to NAND flash memory based on floating gate or charge trapping technology, NOR flash memory, erasable programmable read only memory ("EPROM"), electrically erasable programmable read only memory ("EEPROM"), Ferroelectric RAM ("FRAM"), magnetoresistive RAM ("MRAM"), Resistive RAM ("RRAM"), or any combination thereof.

Each one of NVM dies 124 can be organized into one or more "blocks", which can the smallest erasable unit, and further organized into "pages", which can be the smallest unit that can be programmed or read. Memory locations (e.g., blocks or pages of blocks) from corresponding NVM dies 124 may form "super blocks". Each memory location (e.g., page or block) of NVM 120 can be referenced using a physical address (e.g., a physical page address or physical block address). In some cases, NVM dies 124 can be organized for random reads and writes of bytes and/or words, similar to SRAM.

In some embodiments, NVM 120 can include NVM controller 122 that can be coupled to any suitable number of NVM dies 124. NVM controller 122 can include any suitable combination of processors, microprocessors, or hardware-based components (e.g., ASICs).

NVM controller 122 may include arbiter 130, which can efficiently transfer data between NVM 120 and NVM interface 118, and arbitrate the use of NVM dies 124. For example, based at least in part on a power budget of electronic device 100, arbiter 130 can control which of NVM dies 124 can draw current during a particular period of time. As used herein, a "power budget" can refer to a peak current capacity of electronic device 100.

Arbiter 130 is shown with a dashed-line box in FIG. 1 to indicate that its function can be implemented in different locations in electronic device 100. For example, rather than being included in NVM controller 122, arbiter 130 can instead be implemented in SoC 110 (e.g., in NVM interface 118). As another example, arbiter 130 can be implemented in a controller of a target device of electronic device 100 (e.g., a flash memory drive controller or SD card controller).

Arbiter 130 can receive one or more requests from NVM interface 118 to access NVM dies 124, where each request can be associated with a particular current draw. In response to receiving the requests, arbiter 130 can asynchronously enable the dies associated with the one or more requests to draw current from power source 140. The functionalities of an arbiter will be described in greater detail in connection with FIGS. 3-6.

SoC 110 can include SoC control circuitry 112, memory 114, and NVM interface 118. SoC control circuitry 112 can control the general operations and functions of SoC 110 and the other components of SoC 110 or device 100. For example, responsive to user inputs and/or the instructions of an application or operating system, SoC control circuitry 112 can issue read or write requests to NVM interface 118 to obtain data from or store data in NVM 120. For clarity, data that SoC control circuitry 112 may request for storage or retrieval may be referred to as "user data", even though the data may not be directly associated with a user or user application. Rather, the user data can be any suitable sequence of digital information generated or obtained by SoC control circuitry 112 (e.g., via an application or operating system).

SoC control circuitry 112 can include any combination of hardware, software, and firmware, and any components, circuitry, or logic operative to drive the functionality of electronic device 100. For example, SoC control circuitry 112 can include one or more processors that operate under the control of software/firmware stored in NVM 120 or memory 114.

Memory 114 can include any suitable type of volatile memory, such as random access memory ("RAM") (e.g., static RAM ("SRAM"), dynamic random access memory ("DRAM"), synchronous dynamic random access memory ("SDRAM"), double-data-rate ("DDR") RAM), cache memory, read-only memory ("ROM"), or any combination thereof. Memory 114 can include a data source that can temporarily store user data for programming into or reading from non-volatile memory 120. In some embodiments, memory 114 may act as the main memory for any processors implemented as part of SoC control circuitry 112.

NVM interface 118 may include any suitable combination of hardware, software, and/or firmware configured to act as an interface or driver between SoC control circuitry 112 and NVM 120. For any software modules included in NVM interface 118, corresponding program code may be stored in NVM 120 or memory 114.

NVM interface 118 can perform a variety of functions that allow SoC control circuitry 112 to access NVM 120 and to manage the memory locations (e.g., pages, blocks, super blocks, integrated circuits) of NVM 120 and the data stored therein (e.g., user data). For example, NVM interface 118 can interpret the read or write requests from SoC control circuitry 112, perform wear leveling, and generate read and program instructions compatible with the bus protocol of NVM 120.

While NVM interface 118 and SoC control circuitry 112 are shown as separate modules, this is intended only to simplify the description of the embodiments of the invention. It should be understood that these modules may share hardware components, software components, or both. For example, SoC control circuitry 112 may execute a software-based memory driver for NVM interface 118.

Power source 140 can include any suitable electronic power device or system capable of supplying power to the components of electronic device 100. In some embodiments, power source 140 can be an internal power source, such as a battery of electronic device 100. In other embodiments, power source 140 can be an external power source, such as a laptop computer, a power supply, or a docking station. Thus, power source 140 is shown with a dashed-line box in FIG. 1 to indicate that its function can be implemented in different locations (e.g., as a stand-alone module in electronic device 100 or as a module external to electronic device 100).

In some embodiments, electronic device 100 can include a target device, such as a flash memory drive or SD card, that includes NVM 120 and some or all portions of NVM interface 118. In these embodiments, SoC 110 or SoC control circuitry 112 may act as the host controller for the target device. For example, as the host controller, SoC 110 can issue read and write requests to the target device.

Figure 2:
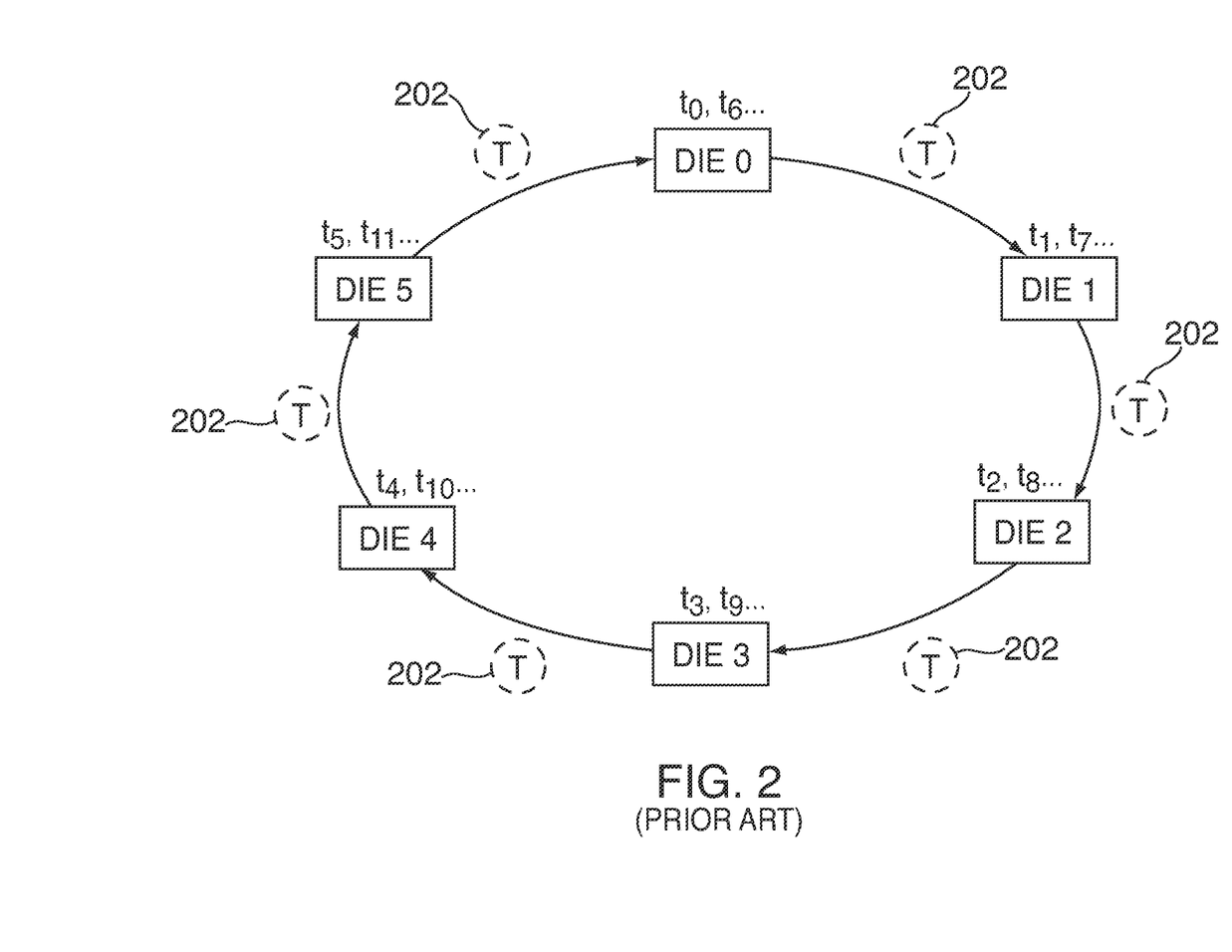
FIG. 2 is a graphical view of one approach to management of power consumption.

Referring now to FIG. 2, a graphical view of a round-robin approach to managing power consumption is shown. Dies 0-5 can be the same as or substantially similar to NVM dies 124 of FIG. 1. Persons skilled in the art will appreciate that a system can include any suitable number of dies. For the sake of simplicity, however, only six dies are shown in FIG. 2.

Using a round-robin approach, token 202 may be circulated to each of dies 0-5. Once a die has been provided with token 202, it can draw current from a power source (e.g., power source 140 of FIG. 1). Once a particular die has finished drawing current, it can pass token 202 to a different die.

For example, as shown in FIG. 2, at time $t_0$, die 0 has possession of token 202. As a result, die 0 can draw current from the power source. Once die 0 has finished drawing current from the power source, it can pass token 202 to die 1 at time $t_1$. Consequently, die 1 can draw current from the power source, and, at time $t_2$, die 1 can pass token 202 to die 2. This process can continue to all of the remaining dies until die 5 has possession of token 202 at time $t_5$. Once die 5 has finished drawing current from the power source at time $t_6$, token 202 can be passed back to die 0.

In such a configuration, a latency problem exists because once a die has drawn power, the die needs to wait for a period of time (e.g., an entire round robin clock cycle) before it can draw power again. For example, after drawing current at time $t_0$, die 0 must wait until time $t_6$ before it regains possession of token 202 and is able to draw current from the power source. Consequently, this approach to managing power consumption can be used for a system that has sequential write operations, where dies can be enabled to draw current in a sequential fashion. However, in the case of a system with asynchronous (e.g., random) write operations, the system may need to enable dies to draw current in an asynchronous fashion in order to match the power demand.

Figure 3:
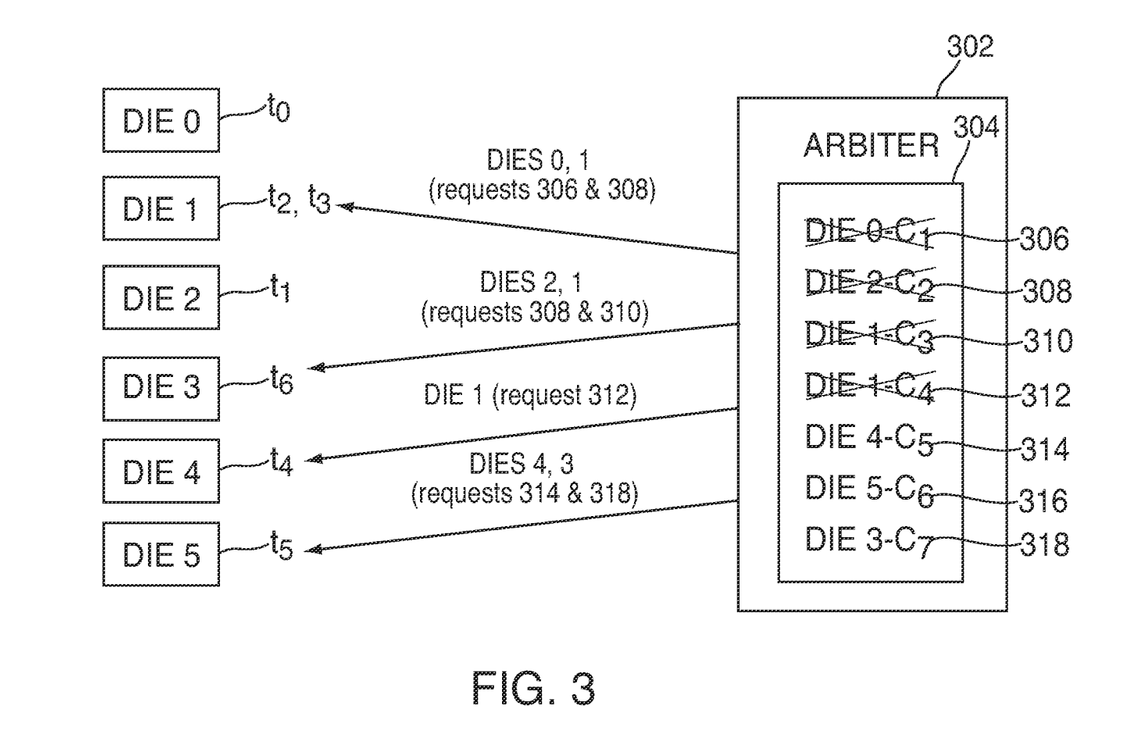
FIG. 3 is a graphical view of another approach to management of power consumption in accordance with various embodiments of the invention.

Referring now to FIG. 3, a graphical view of asynchronous management of power consumption is shown. Arbiter 302 can asynchronously manage power consumption of a system such that a particular die of NVM does not need to wait for a round robin clock cycle to complete before drawing current again. Arbiter 302 can be the same as or substantially similar to arbiter 130 (FIG. 1). In addition, dies 0-5 can the same as or substantially similar to NVM dies 124 of FIG. 1 or dies 0-5 of FIG. 2. Persons skilled in the art will appreciate that a system can include any suitable number of dies. For the sake of simplicity, however, only six dies are shown in FIG. 3. Persons skilled in the art will also appreciate that the asynchronous power management approach discussed below can be used in any other suitable power management contexts such as, for example, in volatile memories (e.g., SRAMs), co-processors, or any other suitable system components.

Arbiter 302 can receive multiple requests to draw current from a NVM interface (e.g., NVM interface 118 of FIG. 1), where each request may be associated with a different die of a NVM (e.g., one of NVM dies 124 of FIG. 1, dies 0-5 of FIG. 2, or dies 0-5 of FIG. 3). In particular, each request of the received requests can be an access request. As used herein, an access request can be a request to perform an operation (e.g., a read, program, or erase operation) on one or more dies of a NVM.

For example, as shown in FIG. 3, arbiter 302 may receive requests associated with die 0 at time $t_0$, die 2 at time $t_1$, die 1 at time $t_2$, die 1 at time $t_3$, die 4 at time $t_4$, die 5 at time $t_5$, and die 3 at time $t_6$. In response to receiving the multiple requests, arbiter 302 can add the multiple requests and associated current draws to a queue of requests 304. In some embodiments, queue of requests 304 can include requests that have been received from the NVM interface but that have not yet been serviced. In addition, in some cases, arbiter 302 can send multiple signals to the NVM interface, where each signal acknowledges each of requests 306-318.

At a later time, arbiter 302 can service one or more requests from queue of requests 304, where the servicing of the one or more requests does not exceed the power budget. Arbiter 302 can determine a servicing order for one or more of the requests based on any suitable suitable parameter(s). For example, the parameters can include the time of arrival of a request, the amount of current draw of a request, a power budget, any other suitable parameter, and/or any combination thereof.

For example, arbiter 302 can determine the servicing order using the time of arrival of a request. In one implementation, arbiter 302 can determine the servicing order based on a first-in, first-out scheme. For instance, arbiter 302 can service each of the requests 306-318 based on the time of arrival of each request. As a result, request 306 will be serviced first, followed by request 308, request 310, and so forth.

In other embodiments, arbiter 302 can simultaneously service multiple requests so long as the servicing of the multiple requests does not exceed the power budget. That is, arbiter 302 can limit the number of dies that can simultaneously draw current from the power source such that the power budget is not exceeded.

For example, in some cases, arbiter 302 can determine the servicing order of multiple requests based on a best-fit scheme. For example, arbiter 302 can select to service a maximum number of requests, where the total amount of current that needs to be drawn of the selected requests is less than or equal to the power budget. As a result, the requests that are selected for servicing can be based at least in part on the power budget.

In the example shown in FIG. 3, for instance, arbiter 302 may determine that requests 306 and 308 cannot be serviced simultaneously without exceeding the power budget. That is, provided that arbiter 302 has started servicing request 306, arbiter 302 can determine that adding the current draw (e.g., $C_2$) of request 308 to the current consumption will exceed the power budget. As a result, arbiter 302 can delay servicing request 308 until the current consumption has decreased.

In contrast, arbiter 302 may determine that requests 306 and 310 can be serviced simultaneously without exceeding the power budget. That is, provided arbiter 302 has started servicing request 306, arbiter 302 can determine that adding the current draw (e.g., $C_3$) of request 310 to the current consumption will not exceed the power budget. As a result, arbiter 302 can service requests 306 and 310 at the same time (e.g., by enabling dies 0 and 1 to simultaneously draw current from the power source).

After a period of time, arbiter 302 can determine that the servicing of request 306 has finished. Arbiter 302 may then remove request 306 from queue of requests 304. Arbiter 302 can then begin to service request 308 in combination with request 310.

As another example, if there are three open requests (e.g., open requests 314, 316, and 318 in queue of requests 304), arbiter 302 can select to service a maximum number of requests (e.g., requests 314 and 318), where the total amount of current that needs to be drawn is still less than or equal to the power budget.

Accordingly, because multiple requests (e.g., requests associated with one or more dies of a NVM) can be serviced without having to wait for a round robin cycle to complete, the latency for servicing power requests and the corresponding input/output latency may be reduced.

Figure 4:
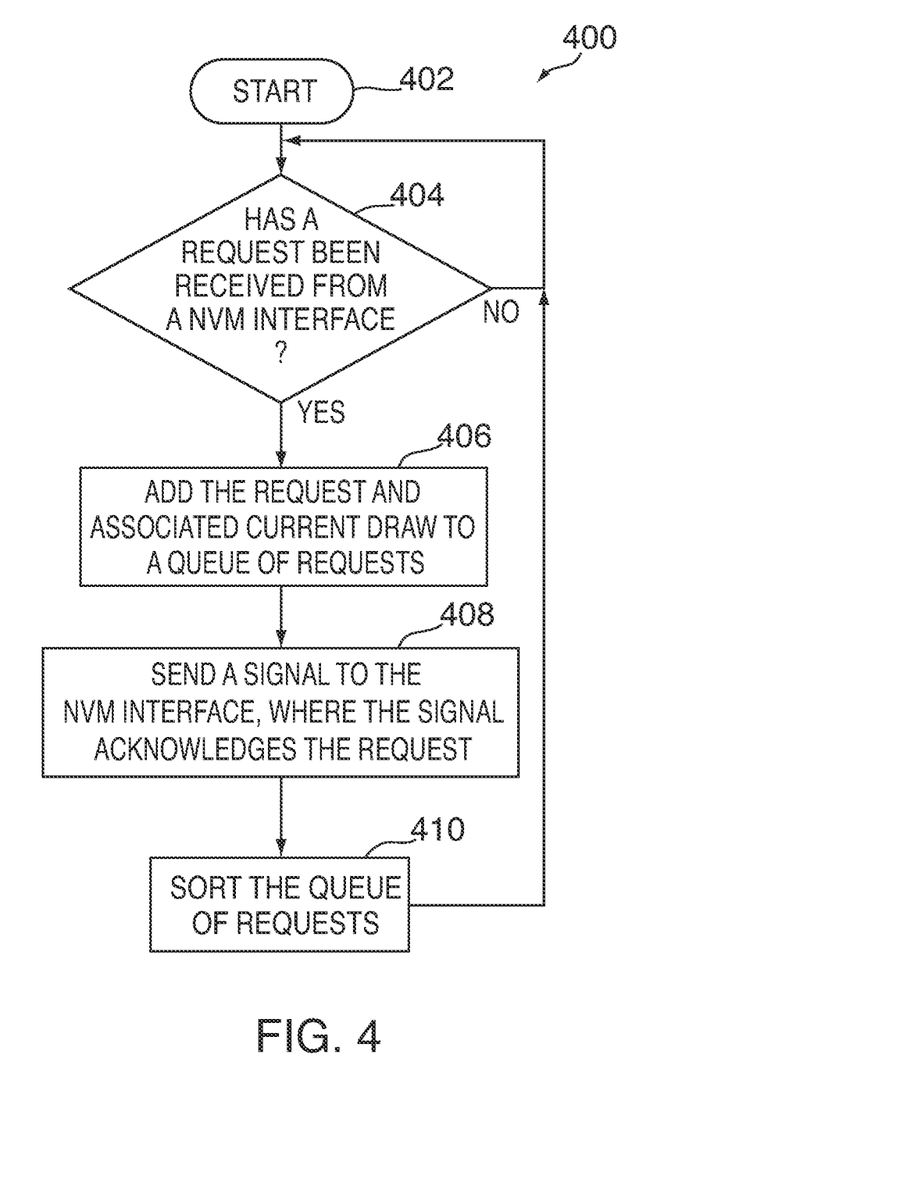
FIG. 4 is a flowchart of an illustrative process for updating a queue of requests in accordance with various embodiments of the invention.
Figure 5:
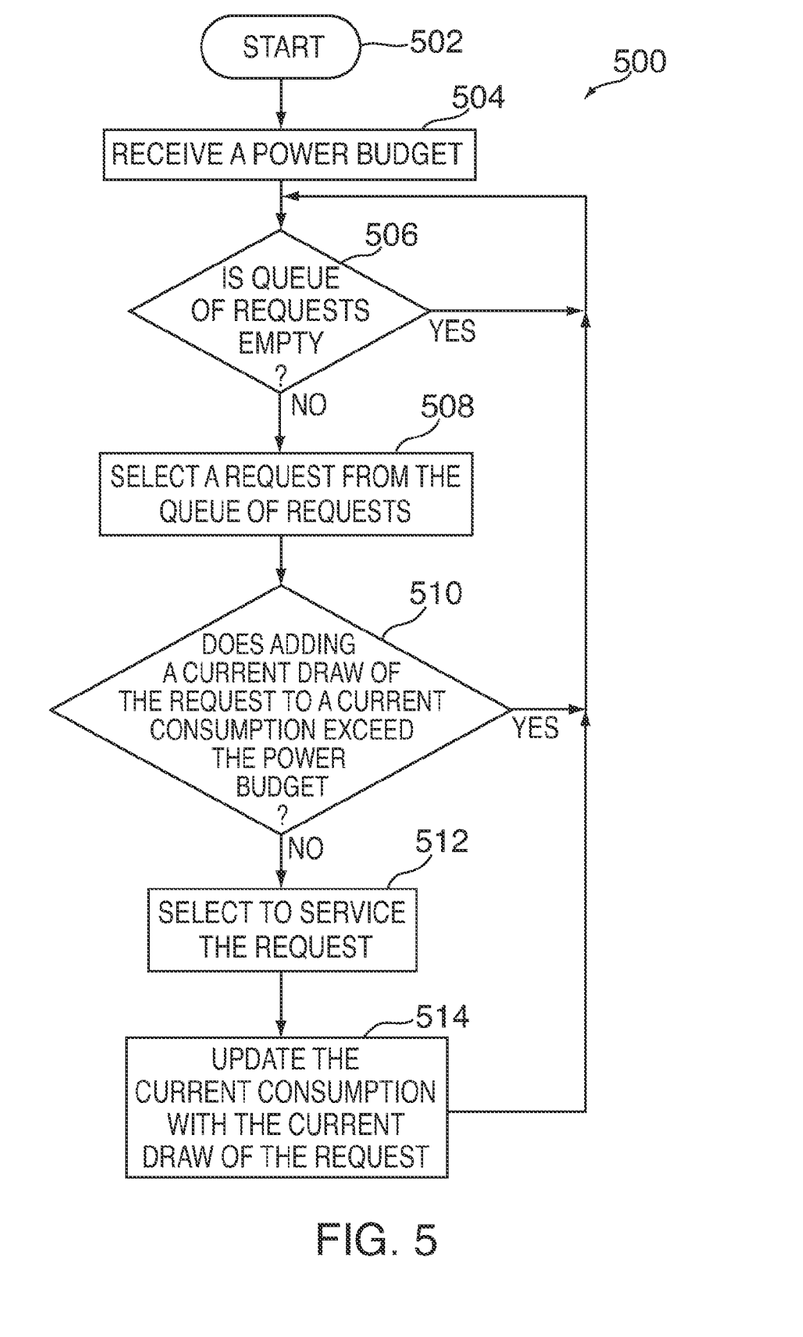
FIG. 5 is a flowchart of an illustrative process for servicing one or more requests to access a memory in accordance with various embodiments of the invention.
Figure 6:
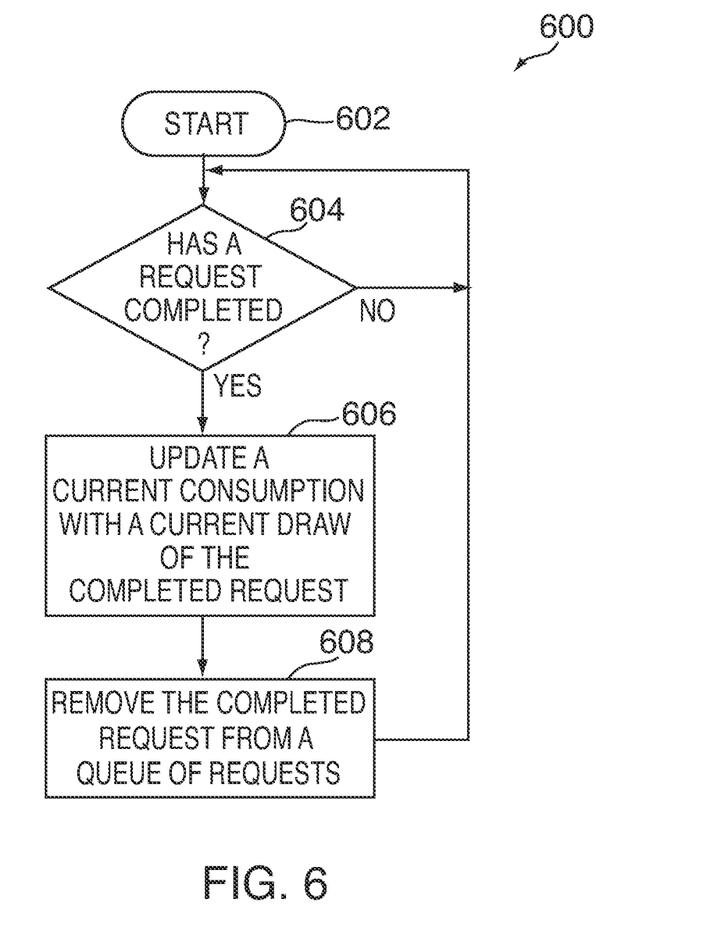
FIG. 6 is a flowchart of an illustrative process for completing one or more requests to access a memory in accordance with various embodiments of the invention.

Turning now to FIGS. 4-6, flowcharts of illustrative processes are shown in accordance with various embodiments of the invention. These processes may be executed by one or more components of a system (e.g., electronic device 100 of FIG. 1). For example, at least some of the steps in the processes of FIGS. 4-6 may be performed by an arbiter (e.g., arbiter 130 of FIG. 1 or arbiter 302 of FIG. 3). In addition, persons skilled in the art will appreciate that at least some of the steps may be performed by a NVM interface (e.g., NVM interface 118 of FIG. 1), SoC control circuitry (e.g., SoC control circuitry 112 of FIG. 1), and/or NVM controller (e.g., NVM controller 122 of FIG. 1).

Turning first to FIG. 4, process 400 is shown for updating a queue of requests. Process 400 may begin at step 402, and, at step 404, the arbiter can determine whether a request has been received from a NVM interface (e.g., NVM interface 118 of FIG. 1). If, at step 404, the arbiter determines that a request has not been received, process 400 can return to step 402, where the arbiter can continue to wait for requests.

If, at step 404, the arbiter instead determines that a request has been received, process 400 can move to step 406. For example, referring back to FIG. 3, at time $t_0$, arbiter 302 may receive a request to draw current from the NVM interface, where the request may be associated with die 0.

At step 406, the arbiter can add the request and associated current draw to a queue of requests. For example, the arbiter can add request 306 (FIG. 3) and associated current draw $C_1$ to queue of requests 304 (FIG. 3).

Continuing to step 408, the arbiter can send a signal to the NVM interface, where the signal acknowledges the request. Then, at step 410, the arbiter can sort the queue of requests. For example, referring back to FIG. 3, arbiter 302 can sort requests 306-318 based on their associated current draw (e.g., $C_1$-$C_7$). In some cases, arbiter 302 can sort requests 306-308 from minimum current draw to maximum current draw. This way, when arbiter 302 is ready to service one or more requests from queue 304, arbiter 302 can select to service the first request in queue 304, which consequently can also be the request requiring the least amount of power. After sorting the queue, process 400 may return to step 404, where the arbiter can continue to receive additional requests from the NVM interface.

Turning now to FIG. 5, process 500 is shown for servicing one or more requests to access a NVM. Process 500 may start at step 502, and, at step 504, an arbiter can receive a power budget. For example, the arbiter can receive a power budget from an NVM interface (e.g., NVM interface 118 of FIG. 1) or from a NVM controller (e.g., NVM controller 122 of FIG. 1).

Continuing to step 506, the arbiter can determine if a queue of requests (e.g., queue of requests 304 of FIG. 3) is empty. If, at step 506, the arbiter determines that the queue of requests is empty, step 500 may return back to step 506, where the arbiter can continue to wait for one or more requests to accumulate in the queue.

If, at step 506, the arbiter instead determines that the queue of requests is not empty, process 500 may move to step 508. At step 508, the arbiter can select a request from the queue of requests. For example, referring back to FIG. 3, arbiter 302 can select request 306 from queue of requests 304.

Then, at step 510, the arbiter can determine whether adding a current draw of the request to a current consumption will exceed the power budget. For example, arbiter 302 (FIG. 3) can determine if adding the current draw (e.g., $C_1$) of request 306 to a current consumption will exceed the power budget. If, at step 510, the arbiter determines that adding the current draw of the request to the current consumption will exceed the power budget, process 500 may return to step 506. The arbiter can thus delay servicing the request until the current consumption has decreased.

If, at step 510, the arbiter instead determines that adding the current draw of the request to the current consumption will not exceed the power budget, process 500 may move to step 512. At step 512, the arbiter can select to service the request. For example, arbiter 302 (FIG. 3) can service request 306 (FIG. 3) by enabling die 0 to draw current from a power source (e.g., power source 140 of FIG. 1). In some cases, the arbiter may service the request along with one or more other requests.

Continuing to step 514, the arbiter can update the current consumption with the current draw of the request. For example, after servicing request 306, arbiter 302 can update the current consumption by adding the current draw of request 306 (e.g., $C_1$) to the current consumption. Process 500 may then return to step 506, where additional requests can be serviced.

Turning now to FIG. 6, a flowchart of illustrative process 600 is shown for completing one or more requests to access a non-volatile memory. Process 600 may begin at step 602, and, at step 604, an arbiter can determine whether a request has completed. If, at step 604, the arbiter determines that a request has not completed, process 600 may return to step 604, where the arbiter can continue to wait for the completion of one or more requests.

If, at step 604, the arbiter instead determines that a request has completed, process 600 may move to step 606. For example, referring back to FIG. 3, arbiter 302 can determine that request 306 has completed.

At step 606, the arbiter can update a current consumption with a current draw of the completed request. For example, arbiter 302 (FIG. 3) can update the current consumption by subtracting the current draw of the completed request (e.g., $C_1$) from the current consumption. After updating the current consumption, process 600 may move to step 608.

At step 608, the arbiter can remove the completed request from a queue of requests. For example, arbiter 302 (FIG. 3) can remove completed request 306 (FIG. 3) from queue of requests 304 (FIG. 3). After removing the completed request, process 600 may return to step 604, where the arbiter can continue to wait for additional requests to complete.

It should be understood that processes 400, 500, and 600 of FIGS. 4-6 are merely illustrative. Any of the steps may be removed, modified, or combined, and any additional steps may be added, without departing from the scope of the invention.

The described embodiments of the invention are presented for the purpose of illustration and not of limitation.

What is claimed is:

1. A method for management of power consumption, the method comprising:
   receiving a plurality of requests and storing the received requests in a queue, where each request is a request to access a die of a plurality of dies of a non-volatile memory and each request is associated with a received time of arrival, wherein the plurality of request comprises a first request associated with a first die and a first arrival time, a second request associated with the first die and a second arrival time, and a third request associated with a second die and a third arrival time;
   selecting a subset of the requests from the queue of requests, wherein each request in the subset is associated with a different die, and wherein the subset comprises the first and third requests;
   determining whether adding a current draw of the subset of requests to a current consumption will exceed a power budget;
   in response to determining that adding the current draw of the subset of requests to the current consumption will not exceed the power budget, at a first time period, asynchronously servicing the first and third requests by enabling the dies associated with first and third requests to concurrently draw power, whereby the asynchronous servicing of requests is evidenced by servicing the third request prior to servicing the second request even though the second request was received before the third request; and
   at a second time period immediately following the first time period, asynchronously servicing the second request if it is determined that a current draw of the second request will not exceed the power budget by enabling the die associated with the second request to draw power.

2. The method of claim 1, further comprising updating the current consumption with the current draw of the subset of requests.

3. The method of claim 2 wherein the updating comprises adding the current draw of the subset of request to the current consumption.

4. The method of claim 1, further comprising enabling the die of the non-volatile memory to draw current from a power source.

5. The method of claim 1, further comprising in response to determining that adding the current draw of the request to the current consumption will exceed the power budget, delaying the servicing of the request.

6. The method of claim 1, further comprising:
   determining whether at least one of the requests has completed; and
   in response to determining that the request has completed, updating the current consumption with the current draw of the at least one of the requests.

7. The method of claim 6, wherein the updating further comprises subtracting the current draw of the at least one of the requests from the current consumption.

8. The method of claim 6, further comprising removing the at least one of the requests from the queue of requests.

9. The method of claim 1, further comprising maintaining the queue in an arbiter.

10. The method of claim 9, wherein the arbiter is operative to asynchronously enable the dies associated with the requests to draw power from a power source.

* * * * *